United States Patent [19]

Rasmussen

[11] Patent Number: 5,626,944
[45] Date of Patent: May 6, 1997

[54] LAMINATED FILMS

[76] Inventor: Ole-Bendt Rasmussen, Obersecki 5, Walchwil/Zug, Switzerland

[21] Appl. No.: 244,860

[22] PCT Filed: Jan. 28, 1993

[86] PCT No.: PCT/GB93/00177

§ 371 Date: Jun. 16, 1994

§ 102(e) Date: Jun. 16, 1994

[87] PCT Pub. No.: WO93/14928

PCT Pub. Date: Aug. 5, 1993

[30] Foreign Application Priority Data

Jan. 29, 1992 [GB] United Kingdom ............... 9201880

[51] Int. Cl.⁶ ............... B32B 3/00; B32B 31/00; A01J 21/00; B29C 55/00
[52] U.S. Cl. .......... 428/172; 428/35.7; 428/35.2; 428/152; 428/167; 428/174; 428/213; 428/910; 264/167; 264/241; 264/288.8; 264/290.2; 156/229; 156/494; 156/496; 425/328; 425/336; 425/374
[58] Field of Search ............ 428/156, 172, 428/154, 35.2, 35.7, 152, 167, 174, 212, 213, 910; 156/344, 229, 247, 290, 494, 496; 264/288.8, 290.2, 241, 167; 425/328, 336, 374

[56] References Cited

U.S. PATENT DOCUMENTS 4,767,488 8/1988 Rasmussen ............... 156/344
4,874,653 10/1989 Rasmussen ............... 428/182

FOREIGN PATENT DOCUMENTS

| 1526722 | 9/1978 | United Kingdom. |
| 1526723 | 9/1978 | United Kingdom. |
| 1526724 | 9/1978 | United Kingdom. |

*Primary Examiner*—Donald Loney
*Attorney, Agent, or Firm*—William J. Daniel

[57] ABSTRACT

A cross-laminate of two or more individually stretch oriented films where the directions of orientation of the films are in criss-crossing relation, has a pattern of generally parallel elongated ribs extending lengthwise of the laminate. The ribs are defined between generally transversely coincident convex and concave curved surfaces on opposite faces of the laminate, the concave surface having a radius of curvature greater than that of the convex surface so that the ribs have a thickness greater than the average thickness of the laminate. The laminate material adjacent to lateral boundaries of the ribs is in a tensionless state reversely curved relative to the rib curvature making the material between adjacent pairs of ribs generally flat. The rib pattern is preferably regular with a preferred average transverse spacing between adjacent ribs, measured peak to peak, of about 1-10 mm. The convex surfaces of the ribs can all be on the same side of the laminate or can alternate in series between opposite sides. The pattern of elongated ribs can be interrupted at longitudinally spaced loci to enhance the flexibility of the laminate and the laminate can have an undulating curvature when viewed from the side. A process and apparatus for making the ribbed cross-laminate by means of intermeshing grooved rollers are also disclosed.

42 Claims, 7 Drawing Sheets

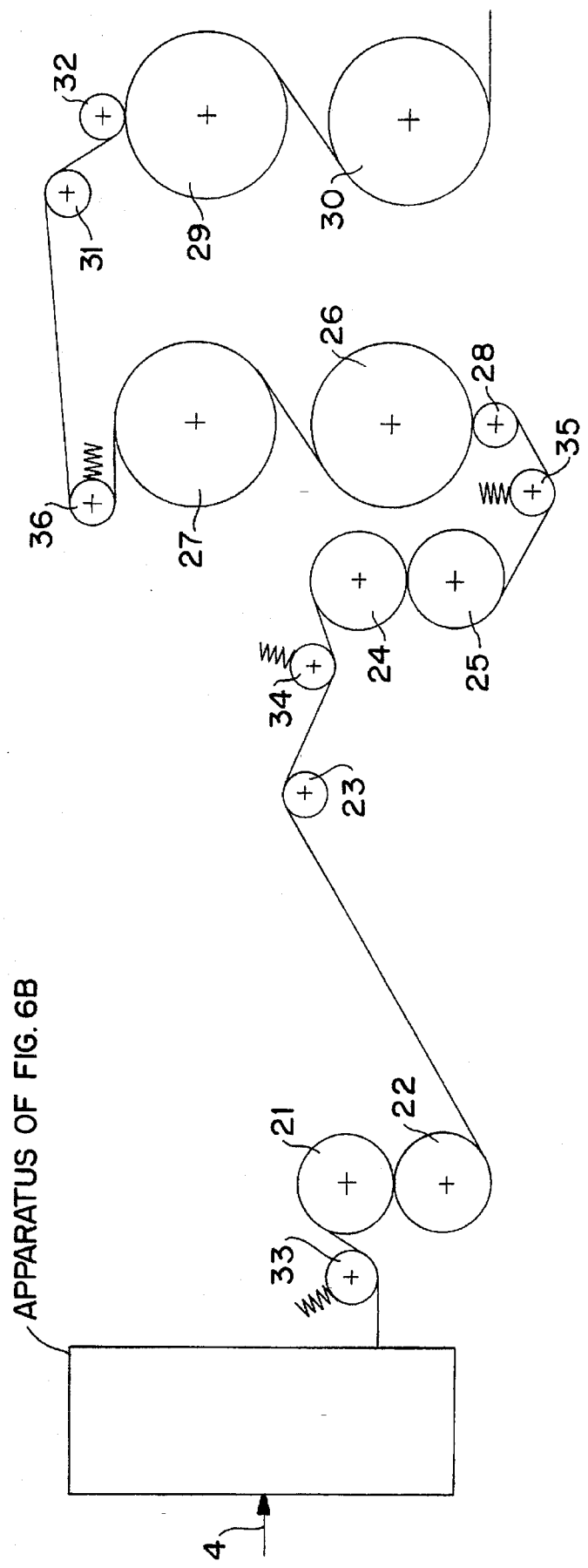

LAMINATED FILMS

BACKGROUND OF THE INVENTION

1. Field of the Invention

The invention concerns an improved cross-laminate of oriented films of the general type defined in the preamble of claim 1 and improved processes and apparatus for manufacturing cross-laminates of this general type.

2. Description of Related Art

Processes for production cross-laminates of oriented films are known in particular from GB-A-1,526,722. In this known invention, the material is melt oriented in a generally uniaxial manner before cross lamination, and is biaxially oriented after cross lamination, preferably near room temperature. The melt orientation may be very weak, but is always combined with the use of blends of polymers, which are sufficiently incompatible for formation of a two- or multiphase grain of polymer under the influence of the melt-orientation, which grain has a very significant influence on the strength properties of the final cross-laminate. In order to enhance the tear-propagation resistance the bonding between the films is a generally weak bonding, but may be supplemented with a strong bonding in spots or lines.

The objective of this known invention is to provide for a film material which exhibits high strength properties in all respects. One of its important uses is for bags and similar packaging uses.

Further according to the above mentioned British Patent, the transverse stretching which is subsequent to the cross-sandwiching of the melt-oriented films (see the introduction to claims 12 and 24) is preferably carried out by passing the sandwich through several sets of mutually intermeshing grooved rollers, the grooves of which are as fine as practically possible. Also, the sandwich is normally (but not necessarily) stretched longitudinally in continuous manner between smooth rollers before, between or after said steps of grooved rollers stretching. (I distinguish between "sandwiching" which may involve, but needs not involve a bonding of the films to one another, and "laminating" which always involves such bonding). For obtaining optimum energy-absorbing properties (such as e.g. shock-tear propagation resistance) the different stretching steps, following the cross-sandwiching, are preferably carried out at temperatures very much below the melting ranges of the films, and may even be carried out at normal room temperature.

Further according to the above mentioned British Patent, the cross-lamination of films having a uniaxial or an unbalanced biaxial melt-orientation can be carried out already in the extrusion process under use of counterrotating dieparts, but can also be established on the basis of helical cutting of melt-oriented, tubular films. Thus the tubular films can be melt-oriented mainly in their longitudinal direction, helically cut e.g. under 45 degrees after solidification, and subsequently sandwiched in such manner that the said main directions criss-cross one another (i.e. become perpendicular to one another if the cutting angles all have been 45 degr.). In this connection, recent WIPO publication WO-A-89/12533 discloses particularly practical methods for spiral cutting of tubular film, and also discloses a suitable method to achieve a melt-orientation, which, if desired, can be perpendicular to the machine direction (i.e. the continous direction) of the film. The last mentioned method consists in first hauling-off the tubular film from the extrusion die in a screw-movement to give the tubular film a melt-orientation which forms an angle (e.g. 30 degrees) to the axis of the tube, and then helically cutting the tubular film (e.g. under 60 degrees) in the way which increases the angle between the machine direction and main direction of melt-orientation. Thus, using the above mentioned example that the "screwing" is under 30 degr. and the cutting under 60 degr., the melt orientation will become perpendicular to the machine direction after the helical cutting. This film can continuously be sandwiched with a film which is melt-oriented mainly in its longitudinal direction (the machine direction) to form a perpendicular criss-cross arrangement.

One of the features mentioned in the introduction to the present claim 1 is that the cross-laminate exhibits a pattern of striations constituted by thickness variations. Such pattern will always be formed as a result of the stretching between grooved rollers—except if special precautions are taken, which will be discussed later. Following the teaching of the above mentioned British Patent (see in particular FIGS. 8 and 9) these thickness variations which form a longitudinally striated pattern, will occur at random as a result of interference between the stretching patterns in each step of the grooved roller stretching. When not exaggerated, the striated pattern can have a positive influence on the tear-propagation properties and some positive influence on the self-supporting capability (the stiffness when the material is bent over a line perpendicular to its continuous direction). However, if this random pattern of thickness variations is very pronounced, it has a very negative influence on u-v stability, printability and the resistance to penetration by humidity, aroma substances and vapours.

As a special feature of the technology, the individual films can be blocked together by the transverse stretching together between grooved rollers, and this effect can be controlled by suitable surface layers on the films, which therefore originally are produced by coextrusion. In the coextrusion process, there is also made provisions to give the final laminate thin surface layers of desirable properties, in particular layers to improve heat-sealing or layers to control the frictional properties.

Further developments of the known technology referred to above are disclosed in U.S. Pat. No. 4,629,525. This describes a stabilization process, in which a cross-laminate of the above mentioned kind is heated while allowing at least 7% transverse shrinkage (i.e. transverse of the continuous direction of the laminate and of the striations produced by the grooved rollers) and preferably also a longitudinal shrinkage. Besides the stabilizing effect, which means that the coldstretched laminate does not tend to shrink further during use or storage at normal temperatures, there are important side-effects. One is that the above mentioned thickness variations (the striation effect) can become significantly reduced, since the transverse shrinkage mainly takes place where the material is transversely over-stretched. Another important by-effect is a significant increase of the yield point in the transverse direction. A third effect is increase of the weak bonding which originally is produced by the blocking-together of the spiral cut films between the grooved rollers.

The transverse contraction is preferably obtained by feeding the cross-laminate, while it is pleated to a suitable extend onto a heated roller (from where it may continue over more heated rollers) so that the pleating gradually disappears while the cross-laminate contracts.

This patent also discloses advantageous polymer blends for the main layer of the coextruded film for this general type of cross-laminates, in particular blends of high-molecular-weight-high density polyethylene and linear-low density or linear-low-density-like polyethylene at significantly lower molecular weight than the first mentioned component, to which optionally may be added polypropylene (as these cross-laminates are more precisely defined in claims 25–29 of the above mentioned patent). Finally, the said patent specification discloses that cross laminates for manufacture of sacks preferably should be made from melt-oriented tubular film cut under an angle between 10° and 35° instead of 45°. Further improvements in the general type of cross-lamination technology described above is disclosed in WO-A-88/05378. Here, at least the first pair of grooved rollers is of special construction and function. The grooved, fine, circular "teeth" have inclined sidewalls, the sidewalls on the cooperating grooved rollers match very exactly, and they operate under a high roller's pressure so that the transverse stretching takes place not only by tentering but also by squeezing or "lateral calendering" of the laminate or sandwich (all as further described in that citation).

By this method it has been possible to manufacture above described cross-laminates in improved quality and at highly increased production capacity. This increase is made possible because two or more cross laminates can be produced together in this process, and separated from one another at the end of the manufacturing process.

The inventor has also combined into the technology the embossment localised adjacent to heat-seals in a bag, which is described in WO-A-89/10312 and which is adapted to produce a shock-absorbing or force-controlling effect thereby improving the drop strength of a heat-sealed bag of oriented or rigid film material and filled with powder or granulated goods.

By a combination of the above mentioned inventions the inventor has been able to manufacture in a commercial and economically feasible process, heat-sealed heavy-duty bags of cross-laminates in gauge e.g. 60–80 $gm^{-2}$, which with respect to yield point tensile strength, puncture resistance, tear propagation resistance and drop-performance have proven superior to bags from low-density or linear-low-density polyethylene of the double gauge. However, due to lack of self-supporting capability of the cross-laminate in such gauges ("flimsiness") the bags have not yet met general market acceptance, since the automatic or manual handling in connection with the filling (the "bagging") has been considered too difficult or unreliable. In this connection it is noted that the self-supporting capability (which is a result of the stiffness of the film) of a film of even thickness varies with the second power of its thickness.

OBJECTS OF THE INVENTION

One major objective of the present invention, therefore is to provide for a cross-laminate (of the above described type) having significantly improved self-supporting capability. Other objectives, will appear from the description below.

SUMMARY OF THE INVENTION

The special features of the product according to a first aspect of the present invention appear from the characterising part of claim 1. The special curved form of the thicker ribs with immediately adjacent material, namely bending to one side in the main body of the rib, and oppositely near its boundaries, provides for high stiffness when the cross-laminate is bent around a transverse line, and the lower thicknesses between the ribs facilitates the bending around a longitudinal line, which also is important in manual or automatic handling of the cross-laminate, since the necessary self-supporting capability of a sheet-material often requires that the operator or the sheet-handling machine gives the sheet a slight bending during the operation.

The ribs are preferably arranged in a generally regular pattern over substantially the entire width of the sheet. It should be noted however, that the process (which will be described later) can be quite sensitive to the influence of the different process parameters, a reason why there can be quite remarkable deviations from the regularity of the distribution and also of the rib-form.

Depending on the intended use of the cross-laminate, the curved ribs can either, in an alternating arrangement, protrude from both surfaces of the cross laminate (see FIG. 2) or protrude from one surface only (see FIG. 1).

A second aspect of the invention concerns an improvement of the above mentioned stretching method described in WO-A-89/10312, which improvement in particular is useful in connection with efficient manufacture of the curved rib structure defined in claim 1, but also finds other uses due to a high regularity of stretching which is achieved.

According to this second aspect of the invention there is provided a method in which continuous polymeric sheet material is biaxially stretched by a process comprising the steps of:

1) combined transverse tentering and transverse squeezing by action of compressionally working grooved rollers, 2) longitudinal stretching between rollers, 3) a second forming and transverse stretching between grooved rollers.

This aspect will be further described after the general description of the embodiments of the curved rib structure and of the method for manufacturing this structure.

Now returning to the first aspect of the invention, the laminate with curved ribs, the average division between neighbour ribs preferably is between 1 and 10 mm, measured from peak to peak and taken as an average.

The average thickness of material between the boundaries of the ribs, defined as the locations where the rib thickness meets the average of the cross laminate in a local region around and including the rib and several neighbour ribs is at least 15% and preferably at least 30% lower than the maximum thickness of the rib.

Thickness at a given point of the laminate surface is understood as the shortest distance from that point to the opposite surface. In the ribs, this is normally not the distance along the route perpendicular to the surface in the given point, because the two surfaces are not parallel.

The average thickness of the material calculated by measuring the weight of a specified area of material (in the tensionless stage) and from a knowledge of the average density of the polymer material used to make the laminate. The average thickness is thus in the direction of perpendicular to the overall plane of the laminate.

Comparing the thickness within the ribs with the average thickness of the material, it must be taken into account that there normally is a considerable variability in thickness of extruded film material (normally not less than ±5% and often ±10%), that the grooved rollers due to bending can produce a lower degree of stretching at the middle, compared to that of the edges, and that on the other hand, the spreading action which follows the grooved rollers stretching and which normally is carried out with banana rollers, normally is most efficient at the middle. Therefore the mentioned comparison must be on a local basis and not a comparison with the average thickness of the entire cross-laminate.

Generally speaking it is found that the thickness variations which are inherent in this first aspect of the present invention, do not significantly reduce the strength properties such as ultimate tensile strength, yield point, tear propagation resistance, impact strength and puncture resistance. The reason for this is that the lower thickness in portions forming longitudinal lines are compensated by a higher degree of transverse orientation. However, when the laminate is used to make bags, the drop strength of the bag when filled with powdered or granulated goods and heat-sealed, can be significantly negatively influenced by very thin portions. The bag could then rupture along a line immediately adjacent to the heatseal, in which line the material was melted during the heatsealing and thereby lost all or most of the orientation. In a preferred embodiment of the invention therefore, generally substantially no local thickness is lower than 30% and preferably no lower than 50% of the average laminate thickness.

The angle between two tangency planes on the concave side of the rib near its two boundaries where this angle is maximum—namely the angle v in FIG. 3—should preferably be at least 10 degrees taken as an average for the different ribs and more preferably between 25 and 90 degrees.

This is of importance for the self-supporting capability, but also to give the cross-laminate more bulk and to give it a resilient character when it comes under vertical pressure. Such bulk and resilience is of importance for the handling of the cross-laminate and is also an objective of this first aspect of the present invention.

The requirement that the surfaces of the material in or adjacent to the boundaries of the ribs in the tensionless state are bent in the opposite direction to the respective surface in the rib results in the cross-laminate having a generally flat appearance rather than a generally corrugated appearance. For instance in the cross-laminate that surface of the rib which is convex within the rib itself becomes concave at or near (usually just beyond) the boundary of the rib. It may remain substantially concave until near or at the boundary of the adjacent rib, for instance where the two ribs are on the same surface of the cross-laminate. The intention is that near to the boundary of the rib the curvature of the surface becomes concave where it was convex and vice versa and the degree of curvature is relatively high or sharp (i.e. the radius of curvature is small) near to the boundary and then decreases i.e. flattens out, before increasing again towards the next rib. The shape of the surface of the embodiment with adjacent ribs formed on the same side of the cross-laminate can be thought of as having a wave-like form with the thickened rib portions having a profile similar to the positive (or the negative, as the case may be) portion of the sine function but with the portion between the ribs being relatively stretched out or expanded (along the abscissa). For a cross laminate with ribs on alternating surfaces the profile is again wave-like with the ribs having a profile similar to the sine function (positioned negative peaks) but again separated by stretched out sections (along the abscissa).

The cross-laminate of the present invention thus differs from the product disclosed in WO-A-8805378 and illustrated in FIG. 6 thereof. The laminate shown in FIG. 6 does not have thickened rib sections. Also the surfaces of each side of the cross laminate are generally sinusoidal in profile and do not have the stretched portions between the maximum and minimum regions.

In the foregoing, the first aspect of the invention has been described with a view to the application for bags and similar applications, in which high stiffness in one direction and much lower stiffness in the other direction is desirable. However, in an embodiment of this aspect the bigger thickness of the ribs and their u-like profile is eliminated, at least in part, in a pattern of transverse lines. These lines act as "flex-lines" so that the cross-laminate readily can be bent, not only over a longitudinal, but also over a transverse line. In this embodiment the objective is the introduction of bulk and vertical resilience in the cross-laminate, at the same time as this is given a high flexibility, which is desirable mainly in textile-like applications, e.g. for tarpaulins and coversheets.

The elimination of thickness and u-shape can be carried out by embossment at a temperature below the melting point, care being taken not to ruin the transverse tear properties, or by a stretching localised to the said transverse lines, like the longitudinal stretching in U.S. Pat. No. 4,285,100 (Schwartz).

As a special feature of this embodiment the production of these transverse "flex-lines" can be carried out at a temperature which, in combination with the applied pressure, produces a strong bonding, preferably a true welding in these lines, while the rest of the cross-laminate is kept weakly bonded or not bonded at all. While a generally weak bonding is necessary for the tear-propagation resistance (as already mentioned in the introduction) the strong bonding localised to the "flex-lines" has the effect that the cross-laminate can be repeatedly and strongly bent in both directions, as when a tarpaulin flip-flops in a strong air jet, without delaminating. In fact the application of transverse "flex-lines", which at the same time are lines of strong bonding, is very useful not only for cross-laminates with u-shaped ribs, but also for any cross-laminate of the type defined in the introduction to claim 1.

As mentioned above in the description connected with claim 1, it is often advantageous that the laminate shows big resistance to bending around longitudinal lines, but low resistance to bending along transverse lines. However, there are also applications in which a high resistance to bending is required in all directions, e.g. in the usual manufacturing process for glued block-bottom bags. For such applications, the laminate with longitudinal ribs as described should preferably exhibit the additional feature that it is undulated or zig-zagging when viewed in its longitudinal sections.

This can be achieved in simple manner, e.g. in the bag making line, by passing the laminate with the described rib structure first through a first set of nip-rollers of which one is a rubber roller and the other a gear roller, which may be relatively sharp edged on the tips of the gear teeth, operating so that the laminate gets a permanent bend around these tips, and then through a second similar set of nip rollers set-up to bend the laminate in the opposite direction and so that the laminate alternately is bent in one and the other direction. The longitudinal ribs of "U-shape" as described have an important function in the stabilisation of this bending.

Preferred compositions for the cross-laminate of the first aspect of the present invention are tri-extruded films with a main layer for strength in the middle and minor layers at the surfaces for facilitated bonding between the films and for heat-seal properties of the cross-laminate and that the main layer of said films consists of 10–30% low density polyethylene mainly of the linear type, and the remainder high-molecular weight polyethylene, high molecular weight polypropylene or a combination of both. These are selected to give a high stiffness in addition to high strength values and heat-sealability.

The process of the first aspect of the present invention is for treatment of a cross-sandwich which is stretched in the direction transverse to the direction of advancement of the web through the process using grooved rollers, and in the process the at least two films are continuously laminated together: and is characterised in that said transverse stretching is effected by forming below the melting point of the thermoplastic material an undulated cross-sectional shape on at least the cross laminate of the cross-sandwich and during or after said forming process, stabilising the tip portions of the undulations on at least on one side of the cross-laminate and transversely stretching the cross-sandwich between the stabilised portions by the use of grooved rollers, this stretching being adapted to maintain the shape or a memory of the shape of the material in the stabilised portions of the undulated shape and subsequently heat-treating the cross-sandwich so that the material between the stabilised portions shrinks along a hypothetical plane lying substantially midway between the surfaces of the cross-sandwich in the local region of shrinkage in a direction lying perpendicular to the direction of movement of the web and if necessary, so that any stabilised portions of the undulating memory of which has been retained in the grooved roller transverse stretching operation are reshaped at least in part, thereby to create a rib patterned cross-laminate in claim 1 with thickened rib portions as defined in claim 1.

Most practically, the undulation of the cross-sandwich is carried out under use of grooved rollers. The simplest, but not most efficient way of giving the tip-portions of the undulated structure a stabilisation of the curved form is by carrying out this forming close to the melting point of the material. The material is first heated to such temperature and is then formed over one or between two slightly intermeshing grooved rollers, the temperature of which is kept well below the temperature of the cross-sandwich so as to avoid that the material stretches on the tips of the grooved roller or rollers. The cross-sandwich is cooled down before the further processing.

An alternative way of carrying out the stabilisation is by cross-linking under use of irradiation. The curved portions to become stabilised are irradiated, e.g. with accelerated electrons while the rest of the cross-laminate is not irradiated. A suitable cross-linking agent may be added in the extrusion process. This may give a very efficient stabilisation but is also relatively complicated in practical production.

The most practical and efficient way of carrying out the forming and stabilisation of the curved portions, is to carry out these two actions as one process by use of compressionally working grooved rollers. This means grooved rollers, in which the grooves have outwardly inclined side walls of which each has a portion that matches with (i.e. during the operation is substantially parallel to) a similar portion on the opposite grooved roller, and which grooved rollers are operated under a high roller pressure to squeeze the material between these parallel portions. Reference is here made to WO-A-88/05378, which already has been mentioned in the description of the background of the present invention, see e.g. FIG. 2 of said publication. For use in the first aspect of the present invention, stretching of the portions on the tips of the grooved rollers should be avoided or minimised at least on one side of the cross-laminate, so that these portions become thicker than the portions which have been squeezed.

The conditions can with advantage be adapted even to increase the thickness of the cross-sandwich portions on the tips of the roller grooves.

It was found that the forming under use of compressional forces has an adequate stabilising effect.

There can accidentally occur a slight amount of stretching at the very middle of a groove tip during compressional stretching, resulting in a narrow thinner portion at the middle of the generally u-shaped rib, in which thin portion the otherwise convex surface may unintendedly become concave (see FIG. 4). As long as this phenomenon does not disturb the general character of the ribs, the product and method will still fall under the scope of the invention.

In order to enable stretching of wide film under use of the high pressures for the squeezing and under maintenance of a high precision in the fitting of the grooved roller surfaces into each other, the stretching arrangement is preferably divided into segments over the width of the cross-sandwich as disclosed in detail in the above mentioned WO-A-8805378, see FIGS. 3, 4 and 5.

As already discussed above 88/05378 discloses that what is intended to become two or more cross-laminates can be transversely stretched together, one on top of the other, between the compressionally working grooved rollers, and then separated later. This procedure is particular advantageous in connection with the first aspect of the invention not only because of the higher production capacity and improved quality of the surfaces which are separated from each other, but also because the squeezing of material into the portions on the tips of the grooved rollers is facilitated when the cross-sandwich is relatively thick during this operation.

The material needs not be longitudinally stretched after being arranged as a cross-sandwich, however in most cases the cross-sandwich is longitudinally stretched prior to or as a step which is second to the stabilisation step, no matter by which means this stabilisation is carried out.

A particularly efficient and suitable way of producing the "U-rib" structure combines the second aspect of the present invention into this first aspect by starting the treatment of the cross-sandwich with a first compressional grooved roller stretching, then the cross-sandwich is stretched longitudinally, then again treated between compressionally working grooved rollers, while this second compressional grooved roller process is adapted to fit with the undulations produced by the first compressional stretching so that the action of the second compressional grooved roller stretching increases the curvature and stabilisation of the material in the rib-portions which was started between the first compressionally working grooved rollers. This "registration" of the two processes does not present any particular problem, provided all three above mentioned stretching steps are carried out in-line with the cross-sandwich passing from one roller to the next with only short distances between said rollers.

During the longitudinal stretching over rollers positioned close to one another, the undulations will partly disappear due to tendency to shrinkage of the polymer material in the transverse direction during stretching in its longitudinal direction, but there will always be at least traces of the undulation left, and this facilitates the "registration" of the second grooved roller process.

Further details are disclosed below in connection with description of the second aspect of the invention.

The total longitudinal stretching of the cross-sandwich can with advantage be divided on two steps, one as described above, and the second following directly after the second step of compressional treatment between grooved rollers. Prior to this second step, the cross-sandwich is preferably cooled in order to preserve the undulations or the "memory" of the undulations.

The cross-sandwich can proceed directly from the second compressional treatment and after a subsequent longitudinal stretching step to a heat-treatment under mild tentering or by ironing, but usually a higher degree of transverse stretching is desirable before the heat-treatment, and this may be carried out by use of a simple grooved roller stretching process, i.e. such that the cross-sandwich touches the surfaces of the grooved rollers only on the tips of the grooved surface pattern.

If only one step of compressional transverse stretching has been applied (or another process for forming and stabilising the curved portions), such simple grooved roller process has to be used in any case.

As a measure to maintain the memory of curved shape in the stabilised portions of the cross-sandwich, this stretching is preferably carried out near room temperature, e.g. between 15°–40° C.

According to a further aspect of the invention there is provided an improvement in a process of transversely stretching a film as described in WO-A-8805378. The process is for transversely stretching a film or film sandwich by passage between intermeshing, driven grooved rollers, which grooves are circular or helical, and in which the film touches the surfaces of the grooved rollers only on the tips of the grooved surface pattern, and the improvement is that in order to remove stretching heat and keep the polymer material at the desired temperature during the stretching, a flow of fluid medium, preferably air or water, is directed through the nip of the grooved rollers on one or both sides of the polymer material. It was found that this measure, in addition to preservation of the memory of curved shape, also helps to make the stretching even, and therefore this measure can with advantage be applied to transverse stretching between grooved rollers of any stretchable polymer film or film sandwich below its melting point, in particular when the material tends to neck down instead of stretching evenly. This tendency to necking will be most pronounced when the polymer material is relatively stiff at the given temperature, and in the case of cross-sandwiches when the angle between the main direction of orientation and the machine direction is relatively low.

While this aspect of the process is generally applicable to grooved roller stretching, the following again concerns the achievement of the cross-sandwich with u-shaped thicker ribs.

The cross-sandwich will leave the grooved rollers in an undulated form with an undulation which need not have any relation to the original formation of curved portions.

The width of the cross-sandwich from edge to edge, measured along the undulated shape, and divided by the straight distance from edge to edge, indicates the average transverse stretch ratio. A part of this stretching will be eliminated by shrinkage during the heat-treatment, while a part must remain in the final product. The mechanically determined allowances for shrinkage and the temperature of the heat-treatment must be carefully adjusted to allow the straightening out of the material between the stabilised portions, at the same time avoiding elimination of the curved form in the stabilised portions, or allowing a recovery of this form, if it was lost before.

This controlled transverse shrinkage can be carried out in an oven, while the edges of the cross-sandwich are guided by conveying devices, but more conveniently by feeding the sandwich in an evenly pleated state to one or more heated rollers, the degree of pleating adapted to establish, in conjunction with the transverse shrinkage, the needed low transverse tension. This is a new use of the method for transverse shrinkage which is described in U.S. Pat. No. 4,629,525 which already was referred to above. By correct adjustment of the degree of pleating and maintenance of a low longitudinal tension, the system will permit shrinkage and establishment of the needed low tension, and the heated rollers will perform an ironing effect.

During this treatment, the bonding between the individual films can be increased to the wanted final value.

Preferably the cross-sandwich is also allowed a longitudinal shrinkage simultaneously with the transverse shrinkage.

The control of the degree of pleating of the cross-sandwich when it meets the heated roller or first heated roller can be established by different methods of which the preferred now shall be explained.

The cross-sandwich coming out of a first grooved roller unit is transversely tightened in a tenter-frame or by use of banana-rollers or the like, and the intermeshing between these grooved roller is adjusted so that the width after the tightening is substantially equal to the desired final width. In this state, the transversely tightened cross-sandwich is fed to a final set of intermeshing grooved rollers, which are set to give exactly the desired degree of pleating. No spreading-out is performed between this last set of grooved rollers and the first heated roller.

In order to establish the correct conditions for the contraction, the degree of pleating at the entrance to the heating-treatment preferably is at such a value that there still are a few narrow pleats in the material as this leaves the last heated roller and these pleats are then removed by very mild tentering, e.g. with a banana-roller. After the heat-treatment, the cross-sandwich is cooled to ambient temperature. If the process involves separation of the sandwich to several cross-laminates, this is preferably carried out as a last step.

As it appears from the description of the background of the invention, the known technology to which the invention is connected, starts with a generally uniaxial melt orientation, which normally is a very weak orientation of polymer blends capable of forming a fibrillar morphology ("grain of polymer") in connection with this meltorientation. The scope of the present invention is neither limited to the use of such blends, nor to the use of weakly melt oriented films for the cross-sandwiching. The tubular films which are uniaxially or unbalancedly biaxially oriented and spiral cut, may have received this orientation below the melting point. In this connection it is observed that strongly or medium-strongly oriented film (uniaxially or unbalancedly biaxially oriented) which after cross-lamination are further stretched, usually thereby receives a very strong tendency to curl up along one of the main axes of orientation. However, by use of the first aspect of the present invention this tendency is interacted by the u-formed ribs, and a much stronger uniaxial character of the initial films is possible, when this is desirable. The achievement of this effect is a further objective of the invention.

The following concerns the second aspect of the invention, the improved stretching method. It should be noted that the second forming and stretching step preferably but not necessarily also is carried out compressionally by combined transverse tentering and transverse squeezing action. As it appear from the foregoing, this second aspect in particular is suitable as first step or steps of the manufacture of the "U-rib" laminate, namely for forming and stabilising the curvature. However, the method can with advantage also be used for other purposes. Thus, if subsequent processes are not set-up as explained above for maintaining or for recreating the "U-structure", the final product may be completely without such curvature, but can exhibit a regularity which is unusual for sheet material stretched between grooved rollers.

By a subsequent calendering process, which even may be carried out at room temperature, it is easy to make the thickness perfectly even if this is desirable. Examples 2 and 3 will present different configurations of stretched sheet material made under use of this method and will explain the differences between the process steps used to arrive at these configurations.

It should also be mentioned that, although this stretching method in particular finds uses in the manufacture of cross laminates, and more specifically in the manufacture of cross laminates from polyolefins, it is applicable in general to all kind of thermoplastic, stretchable sheet material including sheet materials which are not laminates.

There are two alternatives for coordination or "registration" of the two steps of compressional transverse stretching and forming, one being to adjust the division between the undulations on the sheet entering the grooved rollers of the last forming step and the division between the grooves of these rollers to fit with each other. In this connection it is noted that, due to elastic recovery forces, the undulated sheet leaving the grooved rollers of the first forming step will try to expand with relatively big force, thereby tending to increase the division between the undulations. On the other hand the sheet will try to contract in the transverse direction during the longitudinal stretching process, also with a relatively big force, and thereby will tend to reduce this division. By appropriate choice of process conditions these opposite tendencies can be brought to outbalance each other, but normally this will not be a convenient way to make the "registration", because it sets strict limits for the choice of stretching ratios, roller pressures and stretching temperatures. However, if the net expansion or contractions (as the case may be) is found experimentally under the wanted conditions, the grooved rollers of the second forming step can be constructed with a precalculated division between the grooves, and an exact fitting between this division and the undulations can be achieved by small adjustments of the process conditions.

It should be noted that, when the undulations are deep, they show a pronounced tendency to "fall into track" on the grooved rollers of second forming step. Therefore, if the division of these grooved rollers and that of the undulation do not exactly fit to each other, there will still be "registration" at intervals along the width of the sheet and these intervals may be relatively wide and together cover most of the width, but between these intervals of "registration" there will be narrower intervals in which the structure will be irregular.

The alternative way of achieving the "registration" is by using for first and second forming process grooved rollers of the same division, while keeping the distance between each set of rollers which the sheet passes over between the first and second forming processes sufficiently short to force the sheet to keep constant the division between the undulations of the sheet. Preferably the forces acting to keep the division between the undulations constant are increased by supplying rollers which the sheet passes over after leaving the grooved rollers of the first forming process and before meeting the grooved rollers of the second forming process, with guiding tracks, of the same division as the division on the grooved rollers for the first and second forming process.

If smooth rollers are used between the two forming steps, but still using a very short distance between each set of rollers, there may occasionally come irregular bands in the sheet, but in general the structure will become regular.

In a further embodiment of the stretching method the grooves on the rollers for first and second forming process are adapted to squeeze the sheet within bands only, whereby the sheet portions to become peaks of the undulations are not squeezed, so that the squeezed bands of the first forming process are wider than the squeezed bands of the second forming process.

The avoiding of any squeezing on the sheet portions which become peaks is well known from WO-A-89/10312, and the special feature of this embodiment is that the first forming process exerts its squeezing action over wider areas efficiently undulated when it meets the grooved rollers of second forming process and therefore best apt to "fall into track", while on the other hand the narrower areas of squeezing during second forming step secure that there can remain thicker "ribs" in the final product when this is wanted, e.g. for the "U-rib" structure which is described in detail in this specification.

The sheet coming out from the second forming process may be used as it is for special purposes, but normally further longitudinal and/or transverse stretching processes are carried out subsequent to this second forming process, e.g. for manufacture of the described "U-rib" laminate.

In this connection, an embodiment is characterised in that the sheet is heated prior to the first forming process, kept at substantially unchanged temperature before and during the second forming process, and is cooled before the subsequent stretching. This cooling helps to preserve the curvature or memory of curvature as needed in the manufacture of the described "U-rib" laminate. It also enhances tear strength of the final product and improves the evenness of transverse stretching between grooved rollers, when this stretching is followed by a heat treatment under transverse shrinkage (as described in the introduction to this specification).

Finally an embodiment is characterised in that the sheet is subjected to calendering between smooth rollers subsequently to the last transverse stretching step which is carried out before final use of the sheet.

As already mentioned, the stretching according to this second aspect of the invention produces a regularity which is unusually high compared to known stretching processes under use of grooved rollers, even when a low stretching temperature is chosen as required for several purposes. If the stretching process according to this second aspect, including the subsequent stretching steps, do not alone give a fully even sheet thickness and if this required, the evenness is easily achieved by the mentioned calendering even when the temperature during the calendering is at or about room temperature, e.g. up to 50° C.

The invention also comprises apparatus to carry out any of the embodiments of the method according to both first and second aspect. The construction of such apparatus appears from the description of the method and also from the apparatus drawings.

DETAILED DESCRIPTION OF THE DRAWINGS

The invention is illustrated in the accompanying drawings in which:

FIG. 1 shows the embodiment of the product in which the u-shaped ribs protrude from one surface only, FIG. 2 shows the embodiment in which they protrude from both surfaces, FIG. 3 shows a rib and adjacent material more in detail, FIG. 4 shows an irregular rib, still falling under the scope of the invention and FIG. 5 show a preferred process line for the "U-rib" structure of the first aspect of the invention and for the second aspect of the invention as a flow-sheet.

FIGS. 6A and 6B shows a schematic representation of apparatus suitable for carrying out the process of FIG. 5.

DESCRIPTION OF PREFERRED EMBODIMENTS

Figure 1:
Figure 2:

FIGS. 1 and 2 show the thicker ribs, which have cross-section of form like a flat U, and the bendings in the opposite direction at or near the boundaries of the ribs. The cross-section of the cross-laminate shown in FIG. 1 will normally be formed when e.g. four films are taken together in the "Lateral Calendering" process (i.e. through the compressionally working grooved rollers) are separated into two cross-laminates at the end of the process line, provided there is only used one step of "Lateral Calendering". In the more efficient procedure in which two mutually registered "Lateral Calendering" steps are used with longitudinal stretching in between, the cross-section of FIG. 2 will normally be formed. This cross-section will also normally be the result of using one "Lateral Calendering" step alone without any separation following.

Figure 3:
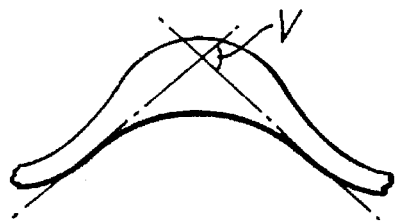

FIG. 3 illustrates the definition of the angle (v) which is the angle between the two tangency planes on the concave side of the rib near its two boundaries at the locations where this angle is maximum. The value of v is at least 10°, taken as an average for the different ribs across the cross-laminate.

Figure 4:

FIG. 4 shows a U-shaped rib which can be formed if a slight amount of stretching has taken place on the tip of the rib-forming grooved roller. This deviation is acceptable as a compromise to enable the use of cheaper machinery.

Figure 5:
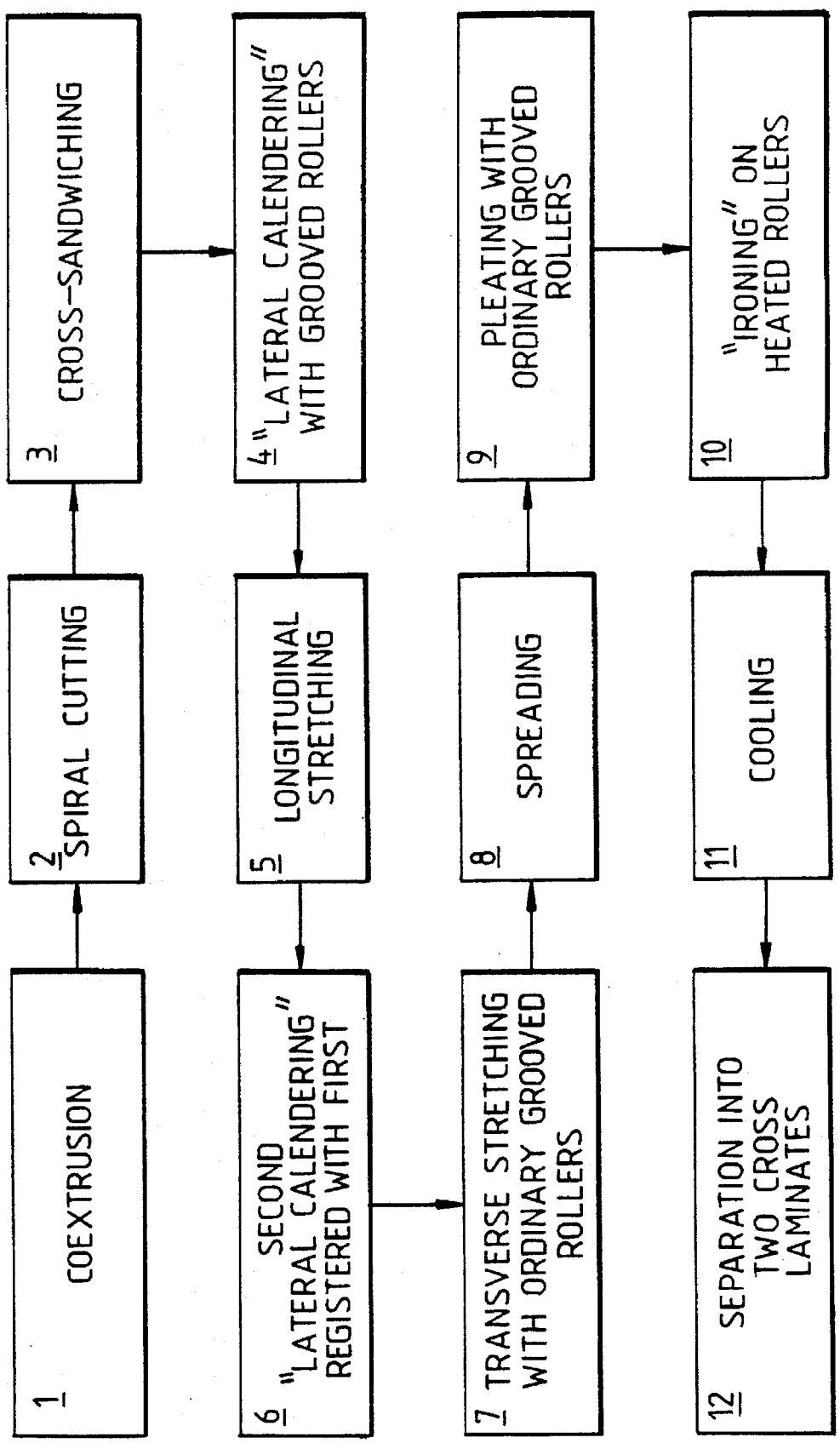

The flow sheet FIG. 5 summarises the most preferable procedure, which involves two steps (steps 4,6) of "Lateral Calendering", and the process steps to form the ribs of the laminate (steps 9,10) has been described in detail in the foregoing.

EXAMPLE 1

This example is based on example 3 WO-A-88/05378, with some variations as explained hereinafter.

The example relates to the manufacture of a high-strength cross-laminate in a commercial process using a technique in which the sheet is stretched and laminated while in double thickness and is separated at the end of the process. Each layer is a coextruded film and contains (1) one surface layer which acts as release layer in the manufacturing process, and which at the same time improves the heat-sealing properties (in the following referred to as release/seal layer) and (2) another surface layer which promotes the bonding (blocking) of the plies of the laminate to each other.

A tubular film is extruded comprising a main layer in the middle, in which layer the strength essentially resides, and the above mentioned release and lamination layers.

The three layers form 75% (main), 15% (release) and 10% (lamination) of the total film.

The gauge of the extruded film is 62 g m$^{-2}$. The main layer of extrusion consists of 70% HMHDPE of density 0.95 (melt flow index about 0.05 according to ASTM D-1238 condition E) 20% LLDPE of hexene type and melt flow index 0.8 (ASTM D-1238 condition E)and 10% homopolypropylene of melt index 0.3 (ASTM D-1238 condition L). The release/seal layer consists of 100% LLDPE while the lamination layer consists of an intimate blend of 70% of the same LLDPE+30% EPDM (ethylene-propylene-dimer) melt flow index about 0.4 (ASTM-D1238 condition E) of trade name "Nordel NDR 5715". (Nordel is a trade mark). The extrusion temperature is 240° C., the diameter of the annular extrusion orifice is 385 mm and the blow ratio 1:1.2. Each of the tubular films is cut helically under an angle of 30° and four such films, each having a width of about 1250 mm, are laminated and stretched with the surface layers facing one another in the following sequence:

(1) lamination layer to lamination layer,
(2) release/seal layer to release/seal layer,
(3) lamination layer to lamination layer.

Initially, the assembly of the four films, which still are not bonded together, is preheated on a pair of rollers to about 50° C. and fed under tension into the apparatus shown in FIGS. 6A and 6B as described further below.

Figure 6B:
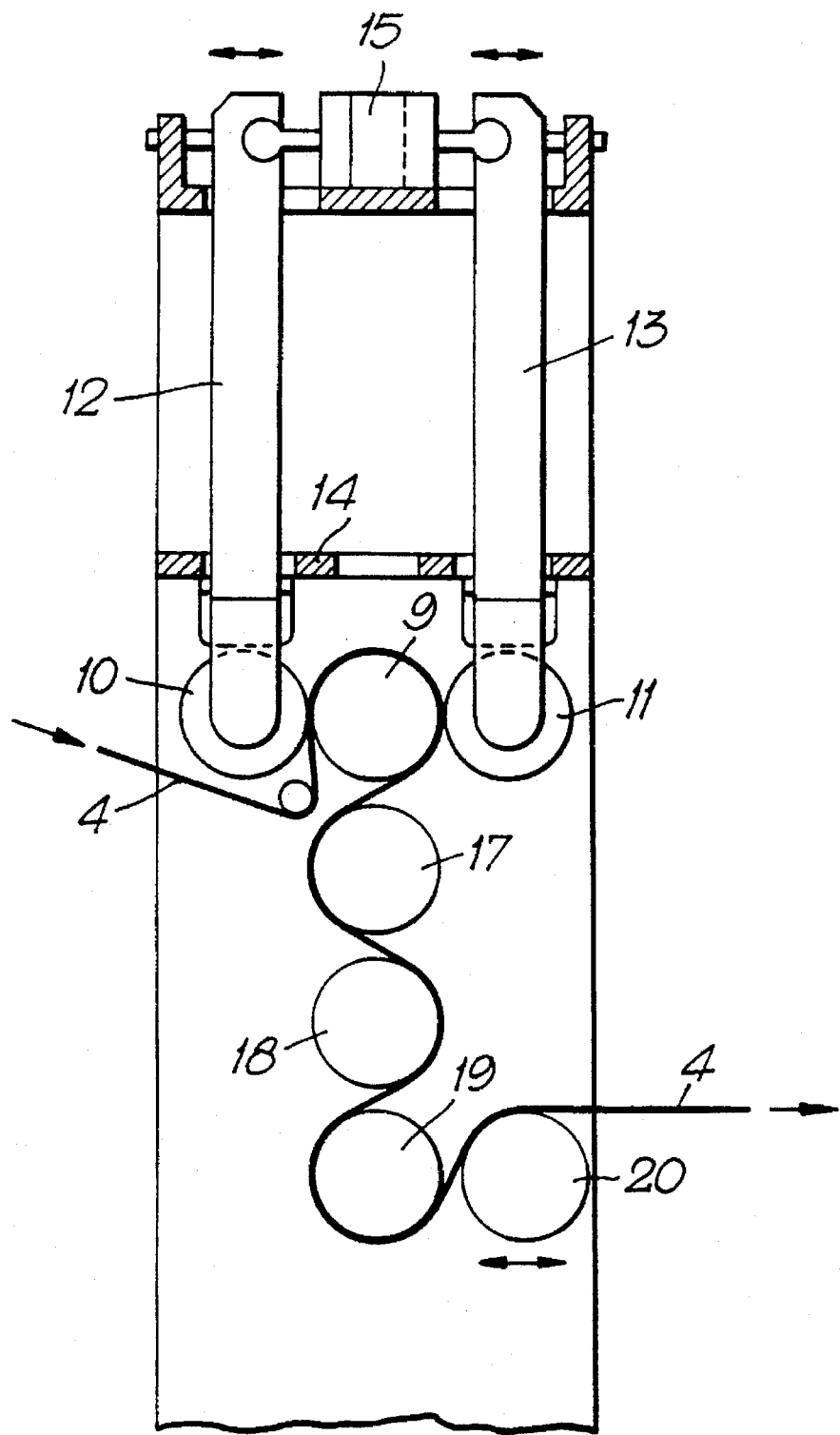
Figure 7:
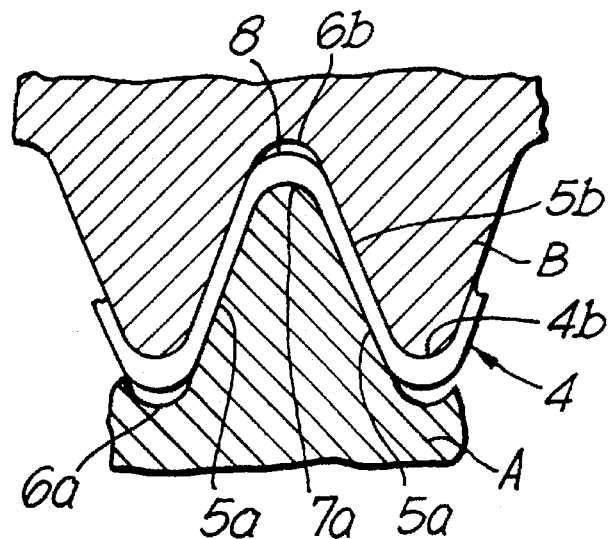
FIGS. 7 and 8 are sections through pairs of grooved rollers at their surfaces in the nip.

The apparatus of FIGS. 6A and 6B comprises a long grooved roller 9 and mutually staggered rows of short grooved rollers 10 and 11 on opposite sides of the roller 9. Each of those rollers has a groove profile as shown in FIG. 7. Each groove comprises a base 6a or 6b, outwardly inclined side walls 5a or 5b and a peak 7a or 7b. The side walls 5a and 5b of opposing rollers are parallel over a portion of their depth. Each base 6a and 6b is of a size such that the film is not under compression between the peak and base, even though it is under compression between the side walls 5a and 5b. This is achieved by shaping each base so as to provide a small space 8 between the film and the base. The peaks 7a on one roller are preferably separated by about 1 mm, in the actual example 1.4 mm. The angle between the parallel portions of the side walls is 55° and the radius of curvature on the tips 0.20 mm. The rollers 10 and 11 are mounted so that they can be pressed against the roller 9 with any chosen force. In practice the roller 9 is driven (by means not shown) and the rollers 10 and 11 can then be driven by the roller 9 through the sheet 4.

The apparatus includes a longitudinal stretching unit consisting of four smooth rollers 17, 18, 19 and 20 (19 and 20 forming a nip) driven at a speed so as to give the desired degree of stretching, and it also includes at least two further pairs of intermeshing grooved rollers 21, 22 and 24, 25. These are of the design shown in FIG. 8 and are all driven rollers.

Figure 8:
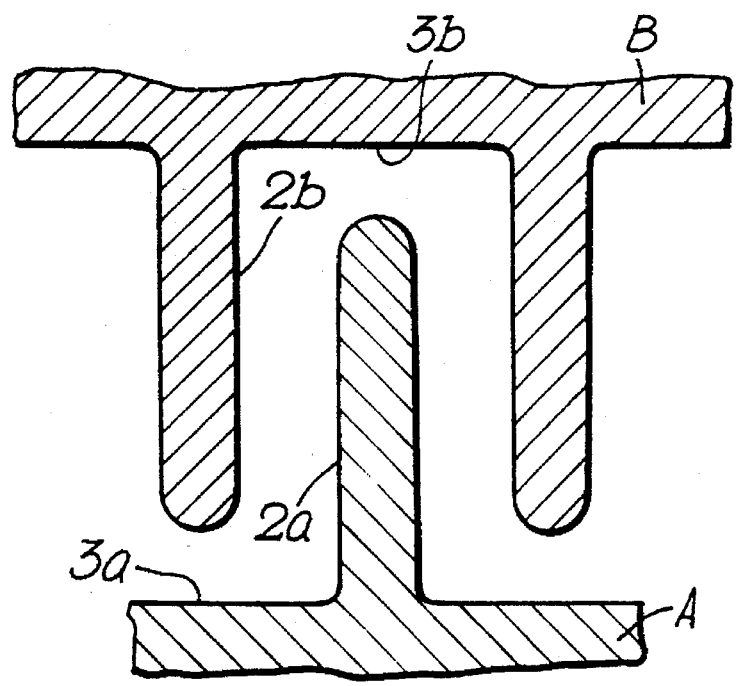

Conventional intermeshing rollers A and B for the transverse stretching of a film 4 are shown in FIG. 8 and have circular grooves formed of a base 3a, 3b side walls 2a, 2b and peaks 1a and 1b. The peaks on one roller have a separation of about 4 mm.

After the first set of conventional grooved rollers 21,22 the cross-sandwich is passed over banana roller 23 which mildly tenters the cross-sandwich and spreads it by eliminating the pleats formed by the grooved rollers 21 and 22. The film is then passed through the second set of conventional grooved rollers 24, 25 to form a pleated shape and, without further tentering, through heated rollers at 80° C. 26, 27 which "iron" the pleated cross-sandwich. The rollers 21, 22, 24 and 25 provide the transverse stretch to the laminate. The film must be relatively cold whilst progressing through those rollers or the memory of the increased thickness portions will not be retained.

Therefore an air jet of ambient temperature is blown through the nip of the grooved rollers 21, 22 and 24, 25 on both sides of the cross-sandwich to cool the sandwich and remove stretching heat, thereby also minimising the tendency to "necking". The ambient temperature is 33° C. (the trial forming the basis of this example having been carried out in a tropical country).

The long roller 9 is formed of 25 segments of hardened steel each 60 mm long and the two rows of short rollers, each comprising 13 rollers, are also formed of hardened steel and each matches a segment. Each segment terminates at each end in a half-groove which is about 0.05 mm wider than the half width of the other grooves, so as to allow for inaccuracies in assembling the rollers and at the same time prevent narrow regions of the film sandwich from becoming strongly squeezed by end teeth on the rollers 10 as well as be end teeth on rollers 11. The segments are firmly screwed together axially on a common core. The segments have a diameter of 200 mm and the short rollers a diameter of 150 mm. The film speed entering the rollers is about 25 m/min.

The roller pressure on the grooved rollers 9, 10, 11 is adjusted to a value which is as high as possible without getting holes in the cross-sandwich, in actual fact to 200 kilo per cm length.

As already mentioned the cross-sandwich is preheated to 50° C. The rollers for "Lateral Calendering" (9, 10, 11) and for the subsequent longitudinal stretching (17 to 20) are kept at 40° C.

The longitudinal stretching is set to give a stretch ratio 1.25:1 in the final product.

The intermeshing of the first set of grooved rollers (21, 22) used after the longitudinal stretching is set to give the final transverse stretch ratio 1.33:1. The final area stretch ratio therefore is 1.25×1.33=1.66:1. Since the original film gauge is 62 $gm^{-2}$ and the final film is two-ply, this means the final gauge should be (2×62):1.66=75 $gm^{-2}$. The final gauge is also directly verified as mentioned below.

Thus, like in the mentioned example 3 of WO-A-88-05378, the cross-sandwich leaving the first set of grooved rollers (21, 22) after the "Lateral Calendering" (9, 10, 11) and longitudinal stretching (17 to 20) is mildly tentered over banana roller 23 before entering the second set of conventional grooved rollers, 24, 25. The distance from edge to edge of the cross-sandwich is kept constant after the passage through the second set of grooved rollers 24, 25, but unlike the conditions in the said example, the second longitudinal stretching is omitted, and the pleated material goes directly to the heated rollers 26, 27 for the heat treatment. These rollers are heated to 80° C., and at the end of this treatment, the material has practically reached this temperature.

The longitudinal tension between the last set of grooved rollers 24, 25 and the first heated roller 26, is kept high, whereby the pleats introduced in the material by these grooved rollers can be kept very evenly distributed, but at the entrance to the heating treatment, the longitudinal tension is reduced to a practical minimum, (i.e. beyond the nip between rollers 26 and 28) so that friction between the heated rollers and the material is kept low to allow elimination of the pleats by transverse shrinkage. Also, a high tension here would cause a too strong ironing effect. The low tension further allows the material to shrink in the longitudinal direction, thereby stabilising this dimension. In order to enable the mentioned change of tensions, roller 26 is driven at controlled velocity and forms a nip together with rubber roller 28. 27 and 28 are idle rollers.

Between the heat-treatment unit 26, 27 and cooling unit rollers 29 and 30 there is installed a very mildly 5 acting banana roller 31 for spreading. 29 and its counter-nip roller 32 are driven, while 30 is idling. The tensions along the line are controlled by tension-control-rollers, 33, 34, 35 and 36

The intermeshing between the last pair of grooved rollers 24 and 25 is very carefully adjusted so that there still are some fine pleats in the material as it leaves the last roller of the heat treatment, but no pleats after the mild banana roller action.

Like in the mentioned example 3, the material is separated into two cross-laminates by peeling apart between the second and third films.

The cross-section is examined in microscope, and the self-supporting capability judged by bending over an edge, with a strip acted by its own weight.

Different samples of ordinary LDPE-film are similarly tried for comparison.

The cross-section is of the type shown in FIG. 1, with the angle v (reference to FIG. 3) typically being 30° and the thickness at the middle of the ribs is about 1.5 times the average thickness between the ribs.

The self-supporting capability according to the mentioned test corresponds to that of a 140 $gm^{-2}$ LDPE-film, while the gauge of the cross-laminate is found to be 73 $g\ m^{-2}$ which agrees closely with the calculated value mentioned above.

EXAMPLE 2

One objective of this example is to demonstrate the 2nd aspect of the invention, in which a sheet in two steps is transversely stretched and formed between compressionally working grooved rollers in a "registered" system with longitudinal stretching between these two compressional stretching and forming steps.

Another objective of the example is to demonstrate a particular efficient procedure leading to the cross sectional configuration shown in FIG. 2, i.e. the configuration in which the convex side of the ribs, in alternating arrangement, is on one and on the other side of the cross laminate (contrary to the arrangement resulting from the procedure of example 1).

The process follows the flow sheet of FIG. 5, except that there is applied a 2nd longitudinal stretching step between steps 6 and 7.

The composition of co-extruded film, extrusion conditions, conditions of spiral cutting and arrangement of 4 spiral-cut films for lamination all are as described in example 1, except that the gauge of each of the co-extruded films in one trial is 65 $gm^{-2}$ and in another trial 130 $gm^{-2}$. Thus, the sandwich used in the process consists of 4 films, each with a 30° angle between the longitudinal film direction (the machine direction) and the direction of melt-orientation, and with the directions of melt-orientation arranged such that the 2-ply laminate which come out at the end of the line both are cross laminates.

Figure 9:
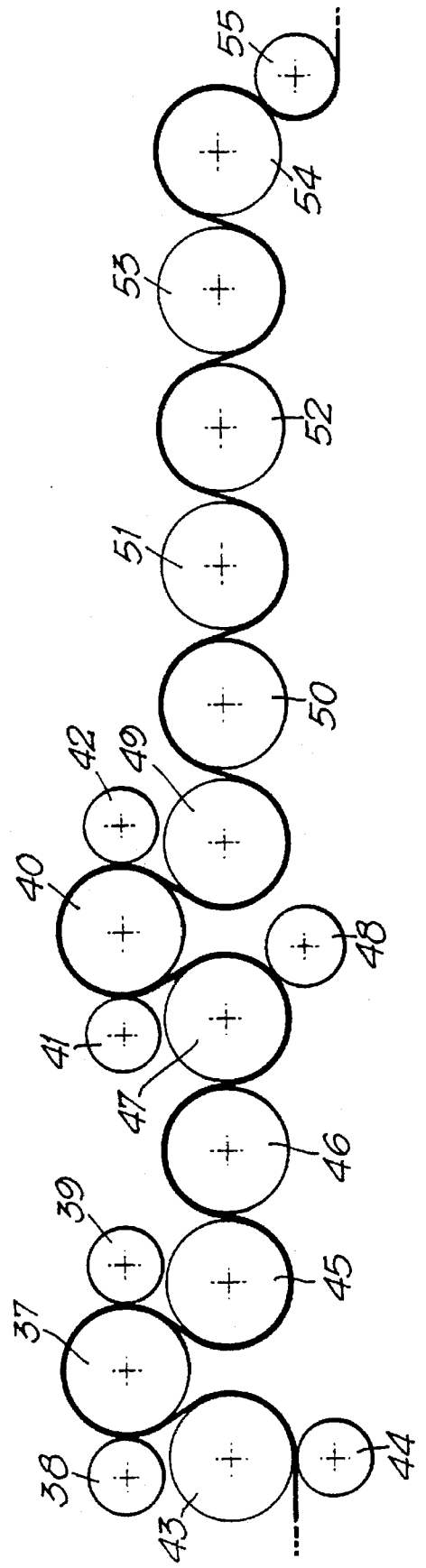
FIG. 9 is a schematic representation of a line suitable for carrying out the process of the second aspect of the invention.

The combined stretching, lamination and forming of "U-Ribs" is carried out in the line shown in FIG. 6A, except that the apparatus indicated by a box now is the roller-line which schematically is shown in FIG. 9.

General description of the stretching line and—process:

The first step of compressionally transverse stretching and forming takes place between, on one side of the film-sandwich the grooved roller 37, and on the other side the 2 mutually staggered rows of short grooved rollers 38 and 39. The similar 2nd compressional step takes place between the grooved roller 40 and the 2 rows of short rollers 41 and 42.

Each of these sets of apparatus for compressional stretching and forming consists of (see FIG. 6B) roller 9, staggered rows of short rollers 10 and 11 and connected equipment 12, 13, 14 and 15, and the surface pattern on the grooved rollers corresponds to that shown in FIG. 7. Dimensions of the rollers and of the surface pattern are mentioned below.

In order to withstand the high forces of the compression, each of these grooved rollers is made of hardened steel. The surface pattern is machined with an accuracy of ±5 micron.

Figure 10:
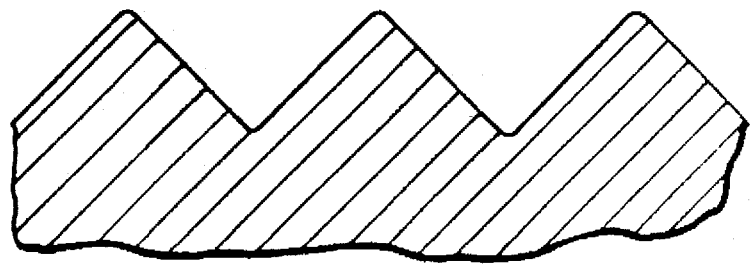
FIG. 10 is a section through one of rollers of FIG. 9 at its surface.
Figure 11:
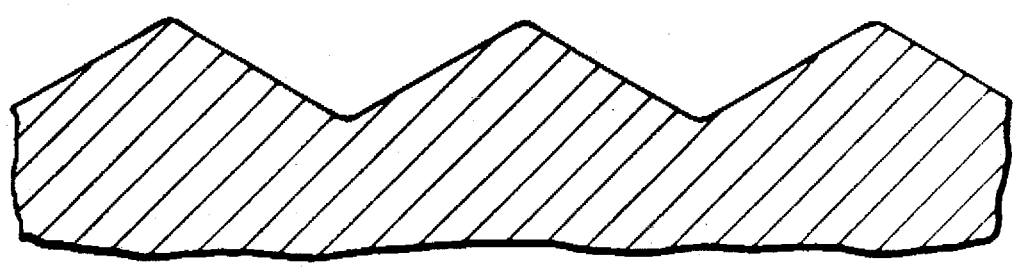
FIG. 11 is a section through another of the rollers of FIG. 9 at its surface.

The 4-ply film-sandwich comes from a roller unit (not shown) in which it is heated to 60° C. It is taken-up by the smooth nip-rollers 43/44 before it meets the grooved rollers 37, 38, 39 for first transverse stretching and forming. From 37 it passes into the first longitudinal stretching apparatus consisting of rollers 45, 46, 47 and 48 and then meets the rollers 40, 41 and 42 for 2nd transverse stretching and forming. In order to "register" the two forming steps, the surfaces of rollers 45, 46 and 47 have guiding tracks as shown in FIGS. 10 and 11. Further about this guiding will be mentioned later. The main longitudinal stretching in this part of the machine takes place between rollers 45 and 46.

The stretched sandwich then passes into the 2nd longitudinal stretching apparatus consisting of the smooth rollers 49 to 55 and continues further as shown in the flow sheet FIG. 5, or in other words through the steps which in FIG. 5 are numbered 7 to 12. As it appears from this, the cross laminate of 4 films is split into two biaxially stretched 2-ply laminates at the end of the entire process line.

All rollers are supplied with drives, except the rollers in the staggered rows 38/39 and 41/42, and except rollers 44, 48 and 55 (which are driven only from the counter rollers through the film-sandwich). 44, 48 and 55 are rubber coated rollers used to form a nip, while all other rollers are steel rollers and have an internal water-circulation either for maintenance of the temperature of the film-sandwich or for cooling, as the case may be (see below).

Temperature:

As mentioned, the sandwich which is fed between the nip rollers 43 and 44 already has been heated to 60° C. in apparatus not shown. Roller 43 is also heated to the same temperature. The compressionally working grooved rollers 37, 38 and 39 ought to be maintained at a slightly lower temperature than the film-sandwich. Should they by mistake get a higher temperature there will be a risk that "necking" will occur in the middle of the ribs as shown in FIG. 4, or deeper than shown. Therefore roller 43 and the bearings and housing in which the short rollers 38 and 39 are nested are kept at 50° C. and there is constantly blown ambient air on 38 and 39. Ambient temperature about 20° C. After the 2nd transverse stretching and forming process, the laminate is cooled to about 20° C. before any essential further stretching, and the laminate is kept at about this temperature at all steps before the heat treatment. Therefore rollers 49 to 54 in FIG. 9 and 21, 22, 24, 25, 29 and 30 are kept controlled at the temperature 20° C.

The main longitudinal stretching during the 2nd step takes place between 52 and 53, whereby the laminate can be sufficiently cooled by the passage over rollers 49 to 52. Like in Example 1, the temperature of the heat treatment rollers (29 and 30, see FIG. 6A) is kept at 80° C.

Velocities of rollers, stretching ratios

When velocities of rollers are mentioned in the text below, this refers to the circumferential velocities.

The velocity at the end of the total stretching line, i.e. after separation into the 2-plies cross laminates, is set to 60 m/min (1 ms⁻).

In order to avoid wrinkles, the roller 37 runs 5% faster than roller 48, and in order to secure a precise transfer to roller 45, this moves 5% faster than roller 37. The ratio of velocities between rollers 45 and 46, which establishes the main longitudinal stretching between the two forming steps, is variable. The adjustment of this will be mentioned later. Roller 47 moves at the same velocity as 46.

In order to produce optimum strength properties, the longitudinally stretched laminate is preferably relaxed, at least in part, between rollers 47 and 40. Therefore the ratio between the velocities of these rollers is also variable. It is adjusted subjectively to a value which gives about minimum tension in the laminate without creation of any wrinkles.

The smooth longitudinal stretching rollers 49, 50, 51 and 52 mutually move at the same velocity, which is 5% faster than that of 40. The ratio between 52 and 53 again is variable (about the adjustment: see below). 54 and 55 move at the same velocity as 53. The setting of tensions during the rest of the stretching line (see FIG. 6A) corresponds to what is written in Example 1.

The intended longitudinal stretch ratio in the final product is 1.35:1. This is achieved by trial and error, while varying the ratios of velocities between rollers 45/46 and 52/53, at the same time keeping these two ratios equal.

The intermeshing of the first set of grooved rollers (21, 22) used after the full longitudinal stretching is set to give the final transverse stretch ratio 1.35:1, i.e. the same as the longitudinal stretch ratio. The final area stretch ratio therefore is 1.35×1.35=1.82:1. This corresponds to a final gauge after separation into two 2-plies, of in one trial 65×2:1.82= 71 gm$^{-2}$ and in the other trial 1.30×2:1.82=143 gm$^{-2}$, which also is established directly. Like in Example 1, the intermeshing between the last pair of grooved rollers (24, 25) is very carefully adjusted so that there still are some fine pleats in the material as it leaves the last roller of the heat treatment, but no pleats after the mild action of banana roller 31.

Pattern of roller surfaces, distance between rollers, diameters of rollers, roller pressures As mentioned above, the surfaces of rollers 37, 38, 39, 40, 41 and 42 are formed as shown in principle in FIG. 7. More specifically, the angle between the parallel portions of the surfaces of the grooves is 55° and the division measured from middle to middle of each tip is 1.60 mm, i.e. 0.2 mm bigger than that used in Example 1. The reason for this is that the machine must be able to stretch a heavier sandwich, namely in the second trials 4×135 gm$^{-2}$ which is equivalent to about 600 micron thickness.

The radius of curvature on the tips are: on rollers 37, 38, 39 0.20 mm and on rollers 40, 41, 42 0.30 mm. Under the prevailing circumstances, the 0.2 mm has been found to be about the smallest which can be applied without creating a neck as shown in FIG. 4, and it leads to a very efficient waving of the cross section of material, with the result that the laminate easily "falls into track" on the following rollers.

The reason why the radius of curvature on the tips on the rollers 40, 41, 42 is bigger than this, namely 0.30 mm, is that the squeezed, band-formed portions in the second forming process then become narrower than the squeezed band-formed portions in the first forming process, which has the effect that the thickening of the ribs becomes more pronounced. If the stretching line were destined only for manufacture of cross laminates without the "U-Ribs" (as the final products in Example 3) it would have been more convenient also to use 0.20 mm as radius of curvature on the tips of rollers 40, 41, 42.

Rollers 45, 46 and 47, which have the function to transfer and longitudinally stretch the laminate without bringing the waved configuration out of order, have much more shallow grooves (tracks) with the same division as those on the grooved rollers for compressionally forming and stretching. On roller 45, the angle between the roller axis and the surfaces of the grooves is 45°, by which they approximately fit with the configuration of the waved cross-sandwich (see FIG. 10) while the corresponding angle on rollers 46 and 47 is only 30° (see FIG. 11) in order to permit the laminate a transverse contraction to which it naturally tends during the longitudinal stretching.

The statement above that the grooves (tracks) on the longitudinal stretching rollers have the same division as the grooved rollers for compressional stretching and forming, must be understood on an average basis as follows: like in Example 1, the long grooved rollers are formed of segments (in this case each segment is 80 mm long) screwed together on a common core, and each segment terminates at each end in a half-groove which is 0.05 mm wider than the half-width of the other grooves. (Explanation: see Example 1). This extra 0.05 mm at each end of each segment is taken into consideration in calculation of the average division, so that errors don't add up from roller to roller.

The waved laminate exhibits a strong tendency to expand laterally before the longitudinal stretching, while the longitudinal stretching creates a tendency to contract laterally. Under the stretching conditions selected in this example, the tendency to expand is prevailing, under other conditions it can be oppositely. However, the tracks on the rollers have the function to avoid any expansion or contraction. In order to achieve this effect, the distance between rollers 37/45, 45/46, 46/47 and 47/40 are only a few mm each and are adjustable. These rollers are very precisely lined-up to keep the waved laminate properly "in track". To this end, the frames for the rollers is made sufficiently stiff, and there is chosen a relatively big diameter (300 mm) for all rollers which otherwise by bending could disturb the alignment. The other driven rollers have the same diameter (300 mm) but in this case in order to get sufficient heating/cooling surfaces.

The distance between 43/37 and between each pair of neighbour rollers in the row 40–54 are less critical and are chosen to about 20–50 mm each. The bearings and frame work is arranged in such a way that the rollers can be brought apart during threading of the line.

The short grooved rollers In rows 38/39 and 41/42 have diameter 150 mm as in Example 1. The pressure between these rollers and their corresponding long rollers 37 and 40, respectively, is set at the highest value which can be applied without making holes in the cross-sandwich. With feeding of 4×65=230 $gm^{-2}$ film-sandwich, a roller pressure of 200 kg per cm roller length is chosen, and with feeding of 4×130= 520 $gm^{-2}$ film-sandwich a roller pressure of 300 kg per cm roller length.

Results

Samples from the 71 $gm^{-2}$ cross-laminate is tested in the same way as in Example 1, while samples from the 143 $gm^{-2}$ cross-laminate only is tested by the microscopical examinations. Both sets of samples show the convex side of the ribs in alternating arrangement on one and on the other side of the laminate as shown in FIG. 2. The gauge between the ribs is clearly more even than observed on the laminate of Example 1. The angle v (reference to FIG. 3) typically is about 40° on one side and 30° on the other side, and the thickness at the middle of the ribs is about 1.8 times the average thickness of the material between the ribs.

The self-supporting capability according to the test mentioned in Example 1 for the cross-laminate of gauge 71 $gm^{-2}$ corresponds to that of a 160 $gm^{-2}$ LDPE film. Compared to the simpler and cheaper process line used in Example 1, the process used in Example 2 has the following advantages:

1. It can make the convex side of the ribs alternately on one and on the other side (FIG. 2) even when the material is separated in the middle at the end of the process.
2. It can produce the "U-Rib" structure at higher linear velocities.
3. It can operate with thicker material.
4. The material between the ribs becomes more even.

EXAMPLE 3

The purpose of this example is to show how the procedure of Example 2 can be modified to make a cross-laminate without "U-Ribs", when this is desirable, and in this connection demonstrate the advantages of carrying out the two compressional transverse stretching steps in "registered" manner.

The procedure of Example 2 is repeated in exactly the same way except as follows:

1. Longitudinal and transverse stretching ratio as measured at the end of the process each is 1.40:1. Areas stretch ratio therefore 1.40×1.40=1.96:1.
2. Temperature of heat treatment 100° C. (Rollers 26 and 27).
3. The intermeshing between the last set of grooved rollers is adjusted by trial and error to a value slightly lower than that which restores the U-shape. (If much lower, the thickness will become more irregular).

The process is carried out both with the four cross-sandwiched films of each 65 $gm^{-2}$ and those of each 130 $gm^{-2}$.

For comparison, similar trials are carried out without "registration", and for this purpose the line is operated in two steps. After preheating of the 4-ply, both steps start between rollers 47 and 48. The first step ends with roller 55, after which the 4-ply is spooled up for use again in second step.

In this step, the 4-ply goes through the entire route from 47/48 to and including the heat treatment, cooling and separation.

Before first step, the 4-ply is heated to 60° C. and rollers 47/48 are heated to the same temperature, while all following rollers are kept at 50° C. Before second step, the 4-ply is heated to 50° C. and the rollers for compressional transverse stretching are kept at this temperature while the rollers for longitudinal stretching are kept at 20° C.

The subsequent processes are carried out under the same conditions as explained above in connection with the "registered" procedure.

In both steps, rollers 47/48 are used to give the 4-ply a 5% strain before the compressional stretching. Total stretch ratios are the same as in the "registered" process.

Results:

Cross sections of all of the final products are examined by microscope. Those which were stretched in "registered" manner exhibit the thicker ribs at even spacing, but between the ribs the thickness is very even. A mild cold calendering easily eliminates the ribs, and the thickness then becomes even all over.

Those samples which were not stretched in "registered" manner, show intervals of about 10–20 mm width which look almost like the above mentioned regular structure (because of the tendency of the waved film to "fall into track") but between each of these intervals there are intervals of about 5–10 mm width in which the structure is irregular, with spots of the cross section frequently less than half of the average thickness.

With the available apparatus for cold calendering, it was not possible to eliminate the thin lines of these cross laminates.

EXAMPLE 4

Example 1 and the "registered" part of example 3 are repeated with the difference that the starting films are made on basis of polypropylene. Composition of middle layer of the co-extruded films (75% of the total film): 80% homo-polypropylene of melt flow index of 0.3 (ASTM No. D-1238 condition L)+20% LLDPE (same ASTM but condition E).

The surface layers, 10% and 15% of the total film are the same as in examples 1 and 2.

Film gauges: 60 $gm^{-2}$ for the trial corresponding to Example 1 and 65 and 130 $gm^{-2}$ respectively, for the two trials corresponding to Example 2.

Otherwise the procedure of these examples are exactly followed.
Results:

Cross sectional profile: The shapes of the U-Ribs closely correspond to the respective samples of examples 1 and 2, except that the trial corresponding to Example 1 leads to a more even thickness between the ribs.

The self-supporting capability, expressed as the thickness of LLDPE film which is equivalent in this respect, is about 20% higher than exhibited by the cross-laminates of Examples 1 and 2.

I claim:

1. An elongated cross-laminate of at least two films formed from orientable thermoplastic polymer material, in which each film is uniaxially oriented or biaxially oriented in an unbalanced manner to thereby have a major direction of orientation, and the major orientation directions of the individual films criss-cross each other with the major direction of orientation of at least one of said films extending at an angle to the length direction of the cross-laminate, and the cross-laminate exhibits a pattern of generally parallel lengthwise extending striations constituted by thickness variations therein resulting from stretching at a given stretch ratio of the cross-laminate transversely to the length direction, wherein said pattern of striations comprises elongated ribs extending in said length direction each of which is substantially defined between generally concave and generally convex curved surfaces which are in generally coincident relation transversely of said length direction on opposite faces of said cross-laminate, the radius of curvature of said concave surface being generally greater than that of said convex surface whereby the ribs have a maximum thickness greater than the average thickness of the laminate, and each rib as a whole has a generally shallow U-shaped transverse cross-section, and the laminate material in or adjacent to lateral boundaries of the ribs in the tensionless state of the material are generally reversely curved relative to the rib curvature to give the material between adjacent pairs of ribs a generally flattened condition.

2. A cross-laminate according to claim 1, wherein said pattern of striations comprised by said elongated ribs is a generally regular pattern over substantially the entire area of said cross-laminate.

3. A cross-laminate according to claim 2, wherein the convex surfaces of the ribs alternate in series from one side to the other side of the cross-laminate.

4. A cross-laminate according to claim 2, wherein the convex sides of the ribs are on the same side of the cross-laminate.

5. A cross-laminate according to claim 2, wherein the average separation between the ribs of adjacent pairs of ribs is between 1 and 10 mm, measured from peak to peak and taken as an average.

6. A cross-laminate according to claim 2, wherein the average thickness of the generally flattened material between lateral rib boundaries, a boundary being defined as the locus where the rib thickness equals the average thickness over a local region including several neighboring ribs and the generally flattened material therebetween, is at least 15% and preferably at least 30% less than the maximum thickness of the rib.

7. A cross-laminate according to claim 1, wherein the U-shaped cross-section of each said rib has a generally re-entrantly curved base between spaced apart sides and planes drawn tangentially to said sides intersect to generally define therebetween an included angle of about 10 up to about 90.

8. A cross-laminate according to claim 1, wherein the longitudinally extending U-shaped ribs are locally interrupted by a pattern of longitudinally separated transverse deformation lines wherein the increased thickness and U-shaped profile of the ribs are substantially removed to thereby enhance the flexibility of the cross-laminate about transverse lines.

9. A cross-laminate according to claim 1, wherein each of said at least two films has three plies including a main layer for strength in the middle and minor layers at its opposite surfaces to facilitate bonding between the films and impart heat-seal properties thereto and the main layer of said films consists of 10–30% low density polyethylene which is mainly linear low density polyethylene, and the remainder is high-molecular weight polyethylene, high molecular weight polypropylene or a combination of both.

10. A cross-laminate according to claim 1, which also has an undulating or zig-zagging curvature as a whole when viewed in longitudinal section.

11. In a process of manufacturing a continuous elongated web of rib-patterned cross-laminate from at least one cross-sandwich web, each such cross-sandwich web being formed from at least two films of orientable thermoplastic polymer material wherein the films are each uniaxially or unbalanced biaxially oriented to impart thereto a major direction of orientation and at least one of the films exhibits an angle between its longitudinal direction and its major direction of orientation, and said at least two films are sandwiched together in a criss-crossing arrangement of the respective major directions of orientation, in which said cross-sandwich web is stretched in the direction transverse to its length by passage of the same lengthwise between grooved rollers and said at least two films are laminated together, the improvement wherein the transverse stretching is effected by forming said cross-sandwich web while at a temperature below the melting point of the thermoplastic material into undulating cross-sectional shape; during or after said undulating forming process, stabilizing in their curved shape tip portions of the undulations on at least one side of the cross-sandwich web; and transversely stretching the stabilized cross-sandwich web in regions between the stabilized tip portions by the use of grooved rollers, this latter stretching being adapted to retain in the stabilized portions either said undulating shape or at least a memory of said undulating shape; and if said stabilized portions retain only a memory of said undulating shape, subsequently heat-treating the cross-sandwich web so that the material in local regions between the stabilized tip portions shrinks along a hypothetical plane lying substantially midway between the surfaces of the cross-sandwich web in a direction perpendicular to the direction of movement of the web, so that said stabilized tip portions which retain only said memory of the undulating shape are reshaped at least in part, thereby to create a rib patterned cross-laminate web with a pattern of elongated lengthwise ribs of generally shallow U-shaped transverse cross-section, said ribs having a maximum thickness significantly greater than the average thickness of the cross-laminate as a whole.

12. A process according to claim 11 in which the heat treatment is conducted whilst subjecting the web to mild transverse tension.

13. A process according to claim 11 in which the heat treatment is conducted by forming the cross sandwich web into pleats of predetermined size and contacting the pleated web with a hot, smooth roller, to thereby substantially iron out said pleats while maintaining the cross sandwich under a transverse tension sufficiently low for said stabilized tip portions to undergo said re-shaping.

14. A process according to claim 11 wherein the cross-sandwich web is longitudinally stretched prior to or immediately following said forming of the web into said undulating cross section and the stabilization of the tip portions of the undulating web.

15. A process according to claim 11, wherein the stabilization of the tip portions is effected by carrying out the forming of the cross-laminate web into said undulating cross-section while the cross-laminate is at a temperature close to the melting point of said thermoplastic polymer material.

16. A process according to claim wherein said thermoplastic polymer material is adapted to undergo cross-linking under irradiation and the stabilization of the tip portions is carried out by cross-linking the polymer material of said web under irradiation.

17. A process according to claim 11, wherein the forming of said cross-sandwich web into undulating cross-section and stabilization of the tip portions thereof are carried out simultaneously by passing the cross-sandwich through compressionally working grooved rollers.

18. A process according to claim 11, wherein a plurality of said cross-sandwich webs, each having the two polymer films arranged with their orientation directions in crisscrossing relation, are stacked together and processed simultaneously and after the processing the plural cross-sandwich webs are separated from the stack.

19. A process according to claim 11, wherein as a measure to maintain the memory in the stabilized portions, the stretching between grooved rollers of the cross-sandwich web is carried out with the material in the stabilized portions being near room temperature, preferably between 15°–40° C.

20. A process according to claim 13, wherein during said heat treating the cross-sandwich web is allowed to undergo both an overall transverse contraction and an overall longitudinal contraction.

21. In a process for transversely stretching a polymer film or a plurality of polymer films arranged in sandwich relation by passing the same between opposed grooved rollers each having on the periphery thereof a pattern of circular or helical grooves and intervening peaks with the peaks of one roller in intermeshing relation with the grooves of the opposite roller, and in which the film or film sandwich contacts only the tips of the peaks of the grooved rollers, the improvement of directing a flow of a fluid coolant medium through the nip of the grooved rollers on at least one side of the film or film sandwich while the same passes between said opposed grooved rollers in order to remove stretching heat and keep the film at the desired temperature during stretching.

22. A method of biaxially stretching an elongated web of polymeric sheet material by the steps of:

1) subjecting the web of material to a first simultaneous transverse stretching and forming operation in which opposite surfaces of the material are compressed towards toward each other over at least laterally spaced longitudinal regions thereof by passing the material through compressionally working opposed grooved rollers from which the material emerges in a transversely undulating configuration, 2) downstream of the compressionally working grooved rollers stretching the web longitudinally by passing the same through opposed rollers rotating at a higher circumferential rate of speed than said compressionally working grooved rollers, and 3) subjecting the longitudinally stretched web to a second transverse stretching operation by passing the same through additional opposed grooved rollers, wherein the stretching conditions are selected to remove from the web material a portion of said undulations while retaining at least a trace of said undulations therein; and said second stretching operation is correlated to the undulations of said first operation by either:

a) adjusting the separation between the undulations in the web to match the separation between the grooves of said additional grooved rollers, or b) utilizing for each of said first and second operations opposed grooved rollers having substantially the same separation between the grooves thereof and locating any intervening pair of rollers through which the web passes between said first and second operations sufficiently near a next upstream pair of rollers that the separation between the undulations of the web remains constant.

23. A method according to claim 22 wherein said additional opposed grooved rollers are also compressionally working opposed grooved rollers compressing opposite surfaces of the web towards toward each other over at least laterally spaced longitudinally extending regions thereof.

24. A method according to claim 22 wherein in the practice of alternative b), at least one pair of feed rollers for said web is provided at a location intervening between said compressively working grooved rollers and said additional grooved rollers and each such intervening pair of rollers is provided on its peripheral surface with a pattern of transversely spaced guiding tracks having a transverse separation that is the same as the separation between the grooves of said grooved rollers.

25. A method according to claim 23 wherein the opposite surfaces of said web are compressed toward one another in both of said first and second simultaneous transverse and forming operations by the respective compressionally working opposed grooved rollers in longitudinally extending transversely spaced bands corresponding to regions of the undulations formed in the web between the tips of adjacent peaks of said undulations leaving the tips of said peaks free of such compression, and the transverse dimension of the bands of web subjected to compressional working by said first grooved rollers is larger than the transverse dimension of the bands subjected to compressional working by said second grooved rollers.

26. A method according to claim 22 wherein said web is subjected to a further longitudinal and/or transverse stretching operation subsequent to the second stretch in operation.

27. A method according to claim 26 wherein said web is heated to a temperature above room temperature before being subjected to said first simultaneous transverse stretching and forming operation and is maintained at the heated temperature until after said second transverse stretching and forming operation and is cooled to room temperature before being subjected to said further stretching operation.

28. A method according to claim 22 wherein as a final step, the web is passed through at least one pair of smooth-surfaced calendaring rollers to calendar the web.

29. A bag made from a cross-laminate according to claim 1.

30. Apparatus for biaxially stretching an elongated film of polymeric material which comprises in sequence:

1) A first transverse stretching and film forming station comprising a first set of driven opposed grooved rollers each having on the periphery thereof a pattern of circular or helical grooves and intervening peaks with the peaks of one roller in intermeshing relation with the grooves of the opposite roller, the grooved rollers of said first set being urged together to compressionally work the film passing therebetween, to thereby transversely stretch the film and simultaneously form the same upon emergence from the first roller set into a transversely undulating configuration;

2) A stretching station to stretch the undulating film lengthwise and partially but not completely remove the undulations therefrom;

3) A second transverse stretching and forming station comprising a second set of driven grooved rollers each having on the periphery thereof a pattern of circular or helical grooves and intervening peaks with the peaks of one roller in intermeshing relation with the grooves of the opposite roller, to thereby transversely stretch the film and simultaneously form the same upon emergence from the second roller set into a transversely undulating configuration; and 4) registration means for maintaining the undulations in the film emerging from the second roller set in substantial transverse registration with the undulations in the film emerging from the first roller set.

31. The apparatus of claim 30 wherein the axial spacing of the grooves of both said first roller set and said second roller set are substantially the same and said registration means comprises support means for the respective first and second roller sets to support the same in sufficiently close proximity that the axial spacing of the undulations in the film emerging from said first roller set is preserved until the film reaches the second roller set.

32. The apparatus of claim 30 wherein said registration means comprises at least one registration roller arranged between said first and said second sets of rollers, each said one registration roller having on its periphery a pattern of circumferential guiding tracks for aiding in bringing the undulations of the film into registration with the grooves of the second set of grooved rollers.

33. The apparatus of claim 32 wherein said guiding tracks are in the form of generally V-shaped circumferential depressions in the roller periphery.

34. Apparatus according to claim 30, in which, downstream of the second set of grooved rollers, there is at least one further transverse and/or longitudinal stretching station.

35. Apparatus according to claim 34 which comprises a heat treatment station after said longitudinal or transverse stretching station.

36. Apparatus according to claim 35 in which the heat treatment station comprises a smooth heated roller and means for applying controlled tension to the film as it contacts the heated roller, and immediately upstream of the heat treatment station there are grooved pleating rollers to provide controlled pleating of the film, by contacting the film at the tips only of the groove pattern of the rollers.

37. Apparatus according to claim 36 comprising cooling means for the film as it passes through the grooved pleating rollers, said cooling means comprising means for supplying sa flow of a cooling medium to the nip of pleating rollers on at least one side of the film.

38. Apparatus according to claim 30 wherein the compressionally working first set of opposed grooved rollers exerts a compressional force against opposite surfaces of said film passing therebetween along longitudinally extending transversely separated regions of said film.

39. Apparatus according to claim 38 wherein said second set of opposed grooved rollers is also compressionally working to exert compressional force against opposite surfaces of the film passing therebetween along longitudinally extending transversely separated regions of the film and the transverse dimension of the regions worked by the first set of opposed grooved rollers is greater than the transverse dimension of the regions worked by the second set of opposed grooved rollers.

40. Apparatus according to claim 30 wherein the grooves of at least said first set of opposed grooved rollers each comprises a base and on each side of the base, upwardly inclined side walls and a peak which is shared with any adjacent groove, the side walls of opposed intermeshing grooves on the opposite rollers being generally parallel over at least a portion of their length, the generally parallel portions of said side walls of opposed grooves compressing therebetween longitudinally extending regions of opposite surfaces of said film.

41. Apparatus for transversely stretching a film of polymer material which comprises a pair of opposed grooved rollers through which the film is adapted to be passed, each roller having therealong alternating circular or helical grooves and peaks, means for biasing said opposed rollers together to bring opposite grooves and peaks into intermeshing relation with the film passing therebetween in contact only with the tips of said peaks of the opposed rollers to form the film into a transversely undulating configuration to thereby transversely stretch the film, and cooling means for cooling the film while undergoing such stretching comprising means for a directing a flow of coolant medium through the nip of the opposed rollers on at least one side of the film.

42. Bag made according to the process of claim 11.

* * * * *

UNITED STATES PATENT AND TRADEMARK OFFICE
CERTIFICATE OF CORRECTION

PATENT NO. : 5,626,944
DATED : May 6, 1997
INVENTOR(S) : OLE-BENDT RASMUSSEN

It is certified that error appears in the above-identified patent and that said Letters Patent is hereby corrected as shown below:

In claim 22, line 19 (Col 24, line 15), before "stretching" insert --longitudinal--.

Signed and Sealed this

Eleventh Day of April, 2000

Attest:

Attesting Officer

Q. TODD DICKINSON

Director of Patents and Trademarks